March 23, 1926.

E. E. TAEUBERT 1,577,663

ELECTRIC CURRENT AND VOLTAGE REGULATOR

Original Filed June 21, 1920     5 Sheets-Sheet 1

INVENTOR,
Edmund E. Taeubert,

March 23, 1926.　　　　　　　　　　　　　　　1,577,663
E. E. TAEUBERT
ELECTRIC CURRENT AND VOLTAGE REGULATOR
Original Filed June 21, 1920　　5 Sheets-Sheet 2

March 23, 1926.
E. E. TAEUBERT
ELECTRIC CURRENT AND VOLTAGE REGULATOR
Original Filed June 21, 1920   5 Sheets-Sheet 3

INVENTOR.
Edmund E. Taeubert,

March 23, 1926.

E. E. TAEUBERT

1,577,663

ELECTRIC CURRENT AND VOLTAGE REGULATOR

Original Filed June 21, 1920    5 Sheets-Sheet 4

INVENTOR.
Edmund E. Taeubert

Patented Mar. 23, 1926.

1,577,663

UNITED STATES PATENT OFFICE.

EDMUND E. TAEUBERT, OF LOS ANGELES, CALIFORNIA, ASSIGNOR TO LEO M. HARVEY, OF LOS ANGELES, CALIFORNIA.

ELECTRIC CURRENT AND VOLTAGE REGULATOR.

Application filed June 21, 1920, Serial No. 393,450. Renewed June 17, 1925.

*To all whom it may concern:*

Be it known that I, EDMUND E. TAEUBERT, a citizen of the United States, and a resident of Los Angeles, in the county of Los Angeles, State of California, have invented new and useful Improvements in Electric Current and Voltage Regulators, of which the following is a specification.

This invention relates to and has for a principal object the provision of an automatically operable regulator device particularly adaptable for connection with an electric generator and interposed in the power line of a generator, for providing a substantially uniform supply of current when the generator is used for charging a storage battery, or for other purposes; also for providing a substantially uniform voltage in the battery line or circuit.

Other objects are:—

To provide in a device of the character stated means for regulating the current for a non-battery circuit; and also for a battery circuit; and for regulating the voltage in the line either with or without a battery; the structure of the device in either of the above cases being substantially the same and the connections being changed and varied for a proper accomplishment of the stated objects.

To provide a rotatable armature in a special form of magnetic field which is operable at a substantially constant speed at all times during the operation of the generator, and which is supported apart from the generator, together with relatively stationary and adjustable brushes for contact with the generator armature, and mechanical connections between said regulator and said brushes whereby one of the brushes may be automatically adjusted relative to the other for increasing or decreasing the number of effective turns of the generator armature winding so as to proportionately regulate and maintain a substantially uniform voltage, or flow of current, as the case may be.

To provide a regulating device embodying a field including laminated pole pieces and a central armature apart from and connected with the generator and adapted to rotate at a substantially uniform speed and develop a consequent uniform torque, self adjusting brush devices for the generator resiliently held in normal position, and mechanical connections between said brushes and said regulator armature, for actuating said brush to compensate for any variation in the speed of the generator.

To provide means for operating a brush, or brushes, on a generator armature by the variation of the current or voltage in the generator circuit. This is accomplished as follows: A lowering of the voltage or current will continue to move a brush, or brushes, in a direction that will raise the current or voltage to normal and balance when this result has been obtained.

A raise of current or voltage will continue to move a brush or brushes in an opposite direction from that above stated and lower the current or voltage until a normal balance is again obtained. This is done by balancing the tension of torque of a slow speed regulator armature against the tension of a clock spring which imparts a nearly uniform tension in a direction opposite to the drag of the regulator armature. The regulator is adapted to rest the brush on the generator commutator at any point on an approximate arc of 90 degrees when the tension of said spring is balanced by the tension or drag of the regulator armature. Such action can not be accomplished by any other type of spring but a clock spring, which has uniform tension. In such a manner will regulation be obtained at all speeds of the generator armature.

In a system in which the whole current or a shunted proportion of the whole current passes through the regulator the regulation becomes sensitive to current and serves to regulate for current. In a system in which only a part of the whole current passes through the regulator and is shunted across the armature brushes and has the same potential as the armature brushes the regulator becomes sensitive to voltage and regulates for voltage.

To provide a regulator having the characteristics above stated which will be especially sensitive to slight fluctuations of current energizing forces. To this end I have provided a slow speed armature adapted to rotate at approximately 200 revolutions per minute and it will be evident that counter E. M. F. in the armature will be apparent only in a very small degree. Therefore, resistance is what determines the flow of current through the circuit in the same manner as if it were stationary. The above statement has reference to systems in which the potential of the generator armature is applied to the terminals of the regulator.

A closed or completed iron magnetic circuit usually will hold increases of saturation and although sensitive to increases of magnetizing energy, it is not sensitive to decreases of magnetizing energy. In order to overcome this holding on tendency of magnetic field designs I have provided a field frame for my regulator which is especially sensitive to energizing forces. The repellent field structure of my design is responsible for its sensitiveness. The energizing coils are so situated that the magnetic circuit is completed therethrough at the extreme ends of the pole face surfaces and the ends of coils abutting like pole faces are of like polarity. The pole face yokes are tapering toward the center of the separable mediums and the armature in this field frame is resilient and capable of instantaneous demagnetization.

To provide a regulator separate from the generator and having no bearing upon the structure of the generator and no dependence upon the winding or the normal or full load speed thereof.

To provide a regulator apart from the generator and having its movement controlled by variations from balance in the circuit, said movement being capable of application for any regulating mechanism, such as a rheostat, commutator, or the like, which may be employed for regulating the potential or flow of current in a circuit.

I accomplish the above objects by means of the mechanism shown in the accompanying drawings, in which.

It will be understood that I have shown in the drawings and will describe in the specifications hereinafter following a single practical embodiment of my invention adapted for the purpose stated, and similar characters of reference are employed in the several views of the drawings and throughout the specifications for indicating the same and like parts.

In the form of device shown in the drawings a unitary structure is represented which embodies, primarily, a suitable form of generator G mounted at one end of the unit, a regulator R mounted at the other end thereof and above the plane of the generator, a cut-out mechanism superimposed upon the structure for convenience and accessibility, and a suitable mechanism carried in one end of the structure for affording physical connections between the regulator R and generator G.

The unitary structure which carries all of the said elements is composed of a base B having vertical ends E and E' attached thereto at its opposite extremities by means of screws 1, 1, etc., and a thin sheet metal housing, or cover H which slightly overlaps the ends E and E' and is held on the sides of the base B by means of screws 2, 2, etc.

End member E has a cylindrical extension 3 and a vertical extension 4 integrally formed therewith, and a horizontal shaft S is suitably journaled in the extension 3 and may carry on its outer end a gear 5 or another form of power transmitting device adapted for connection with a source of power for operating the generator G.

A pair of vertical pole pieces P and P' are suitably attached to the base B and carry in their upper portions a transverse bolt 6 supporting a core on which the field winding F of the generator is held between the said pole pieces, and a nut 7 is provided on the bolt for holding the parts in position, suitable recesses 8, 8 being provided in the pole pieces for receiving the head of the bolt and the nut thereon, as shown. The lower portions of said pole pieces are turned out as at 9, 9, to revolubly receive the armature A of the generator which is held on the shaft S.

End member E' has a boss 10 alined axially with the shaft S and a ball race 11 is held therein to receive a ball bearing element 12 carried on the inner end of shaft S. Thus the shaft S is rotatably held in position on the ends E and E'.

Figure 1:
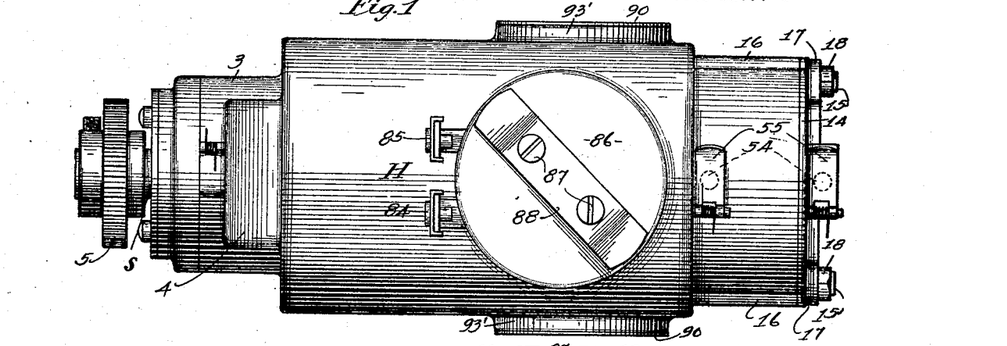
Fig. 1 is a plan view of a unitary structure embodying a self contained generator and regulator device.
Figure 2:
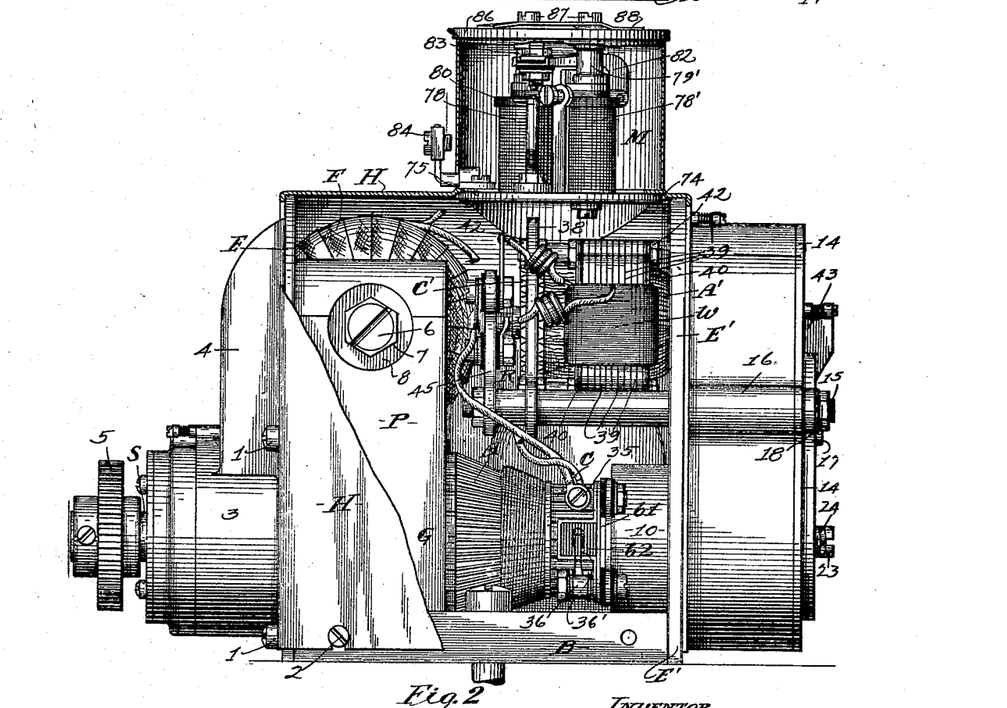
Fig. 2 is an elevation of the same, partly in section.

End member E' has a deep recess 13 therein which is closed at the end by means of a plate 14 held in position by means of a pair of like studs 15, 15 extending through portions 16, 16 of end member E' and lugs 17, 17 of plate 14 and nuts 18, 18 are held on the outer ends of said studs, as shown in Figs. 1 and 2.

The end of boss 10 of member E' has a bearing member 19 suitably held thereon and a shaft 20 has its reduced end 21 held in said member 19, while the outer end 22 thereof seats in a boss 23 formed on plate 14 and has a pin 24 therein which engages a slot 25 in said boss and prevents the shaft 20 from turning. A sector gear 26 is rotatably carried on shaft 20 within the recess 13 of member E' and spaced therefrom is a disc 27 attached to the gear by means of screws 28, 28. Between the gear 26 and disc 27 I provide a spiral spring 29 which is fixed at its inner end to the shaft 20 and at its outer end to one of the screws 28, so that when the gear 26 is rotated said spring will be placed in tension and serve to restore the gear to normal position when the gear rotating means is released, as hereinafter described.

Disc 27 has an inwardly turned flat extension 30 which overlies the periphery of the boss 10 of member E' and projects to a point substantially forward of the face of the boss into the plane of a commutator C carried on the generator shaft S and connected with the generator armature A. A suitable brush holder $b^1$ is attached to the enlarged end 31 of extension 30 and a brush $b'$ is held in said holder for engagement with the commutator C. A similar but relatively stationary brush holder $b^1$ is attached to the face of boss 10 by means of screws 32 and carries a brush $b^2$ also for engagement with commutator C. Brush $b'$ has a terminal 33 and spring post 34 and brush $b^2$ has a terminal 35 and spring post 36 for operably connecting the brushes as hereinafter described, and springs 34' and 36' carried on posts 34 and 36 respectively resiliently engage the brushes for holding them in contact with the communicator C.

Figure 18:
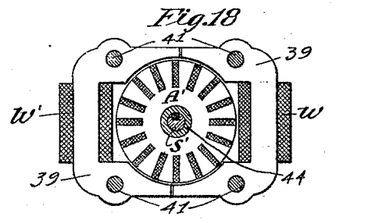
Fig. 18 is a sectional elevation of the regulator field and armature.

The studs 15, 15, have inwardly extending portions 37, which carry a transverse plate 38 in a plane substantially spaced from member E' and to this plate pole pieces composed of a plurality of laminations 39, 39, etc., and end pieces of insulating material 40, 40 are attached and held together and on plate 38 by means of studs 41, 41, extending through the parts 39 and 40 and member 38 and have nuts 42, 42 on the opposite ends thereof, as shown. The parts of the pole pieces are halved, as shown in Fig. 18 and field windings W and W' are provided on the side portions thereof. The laminations 39 are formed of like members oppositely mounted about the axis of armature A' and their meeting portions are staggered with respect to the different laminations so as to properly aline the plates. Within the field I provide a regulator armature A' having a face commutator C' on the inner end thereof, both of which are suitably supported on a shaft S' stationarily held at its outer end in a bearing 43 on plate 14 by means of a screw and at 43' its inner end on an auxiliary frame member 45 carried on the ends of studs 15 and spaced therefrom by means of members 46.

Figure 19:
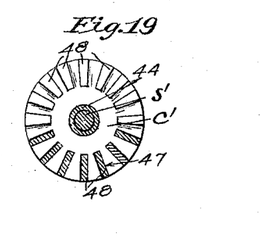
Fig. 19 is an end view of the regulator commutator, partly in section.
Figure 20:
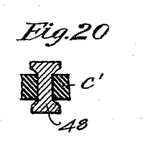
Fig. 20 is an enlarged transverse section of the same.

Armature A' is rotatably carried on shaft S' and has a plurality of laminations corresponding to the laminations of the pole pieces and a commutator C' connected therewith is composed of a single disc of fibre or the like provided with radial slots 47 therein adapted to receive and hold a plurality of segments 48 of the character shown in Fig. 19 and 20. Flat springs 49, and 50 are mounted on member 45 by means of screws 51 and have brushes $b^3$ and $b^4$, respectively, thereon, which are adapted to engage the face of commutator C'. Armature A' and commutator C' are fixed to a sleeve 44 loosely carried on the shaft S' and rotate together at all times, and a groove 52 is provided on said shaft in which a strip of felt 53 or the like may be held for saturation with oil for the purpose of lubricating the shaft bearings, the oil being supplied through an oil hole 54 provided in the bearing 43, covered by a spring held cover 55. Other oil holes and covers of like character are provided at suitable points on the structure, as shown.

Figure 14:
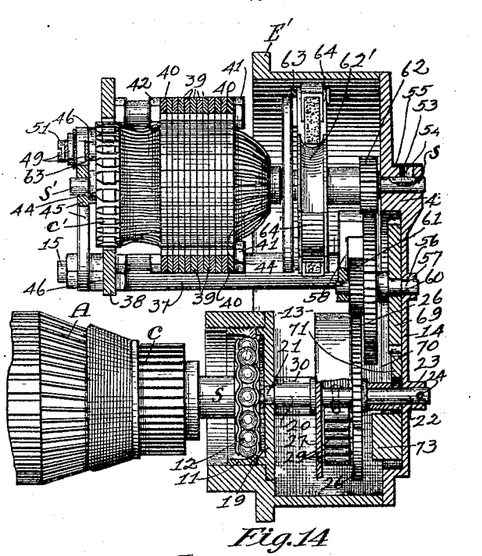
Fig. 14 is a sectional elevation of my mechanism showing the connections between the regulator device and the generator.
Figure 15:
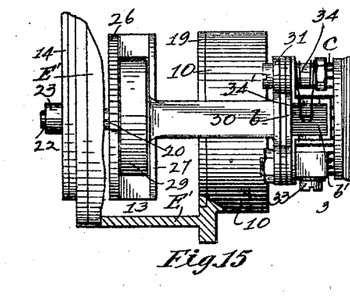
Fig. 15 is a fragmentary view of the same as viewed from the opposite direction from Fig. 14.
Figure 16:
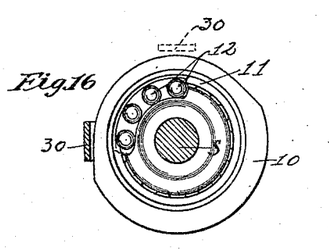
Fig. 16 is a face view of the inner generator armature shaft bearing.
Figure 17:
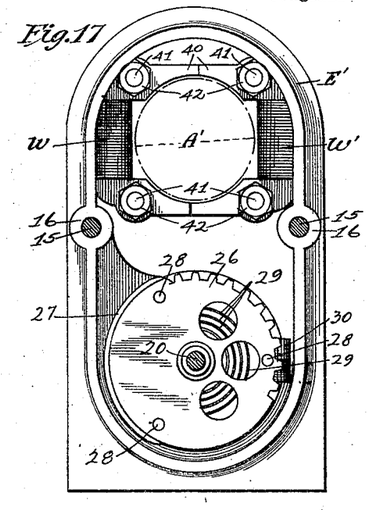
Fig. 17 is an elevation of the mechanism as viewed from an opposite direction from that shown in Fig. 11.

A short spindle 56 is carried in a bearing 57 of plate 14 and an inner support 58 attached to said plate by means of screws 59, and an idler gear 60 and pinion 61 are rotatably held on said spindle, as shown in Fig. 14. Pinion 61 meshes with and operates the sector gear 26 and gear 60 meshes with and is operated by pinion 62 rotatably carried on the shaft S' adjacent to the plate 14 and integrally formed with a grooved pulley 62'. Said pulley and gear, it will be understood, are loosely held on said shaft S', while a clutch device composed of a supporting member 63 fixed to the sleeve 44, a pair of like semi-annular members 64 and 64' pivoted to member 63 at points 65 and 65', respectively, and friction elements 66 and 66' pivoted to members 64 and 64' at points 67 and 67', respectively, is adapted to communicate motion between the shaft S' and the pinion 62. The friction elements 66 and 66' may be of felt, or the like, as shown, and are adapted to engage the groove of the pulley 62'. Thus, when the armature shaft S' is rotated, as in the case of a motor, the members 64 and 64' will be thrown out from their normal positions by centrifugal force at their end portions 68 and their other ends carrying the friction elements will be moved inwardly to a corresponding extent and cause a frictional engagement between the members 66—66' and pulley 62'. If the speed of the shaft S' is accelerated to a point above normal the friction clutch will serve to rotate the pinion 62 and effect a corresponding movement of the adjustable brush b' relative to the commutator C on the generator shaft S and the movement of said brush will move against the nearly constant tension of the spring 29.

Spindle 56 also carries a star escapement wheel 69 held in a recess 70 of plate 14 and adapted to be engaged by an escapement disc 71 pivoted on a screw 71', and has pawls 72, 72 thereon and a weight 73 on the lower portion, and said escapement mechanism limits the speed of operation of the brush b' in a manner well known and obvious.

Housing H has a boss 74 on the top thereof which has a cut-out supporting ring 75 attached thereto by means of a plurality of screws 76, and a diagonal portion 77 of said ring carries a shunt coil 78 and a series coil 78' held in position by means of studs 79 and 79' which are extended at their upper ends above said coils for purposes hereinafter described. Intermediate of said coils I provide a contact device composed of a post 80 mounted on a portion 81 of said supporting ring and adapted to be engaged by a movable contact member 82 pivotally held on the upper ends of the studs 79 and 79' and having a terminal 83 thereon. Contact post 80 has a terminal 84 extending outwardly from said boss and a like terminal 85 is also extended therefrom for connection with the system, as hereinafter described. A suitable housing member H' is provided for enclosing the cut-out mechanism described and is adapted to seat on the boss 74, and a detachable cover 86 is held on said housing by means of screws 87, 87 extending through a flat spring 88 on the top of said cover and into the ends of said studs 79 and 79'.

Figures 3, 4, 5, 6, 7, 8:
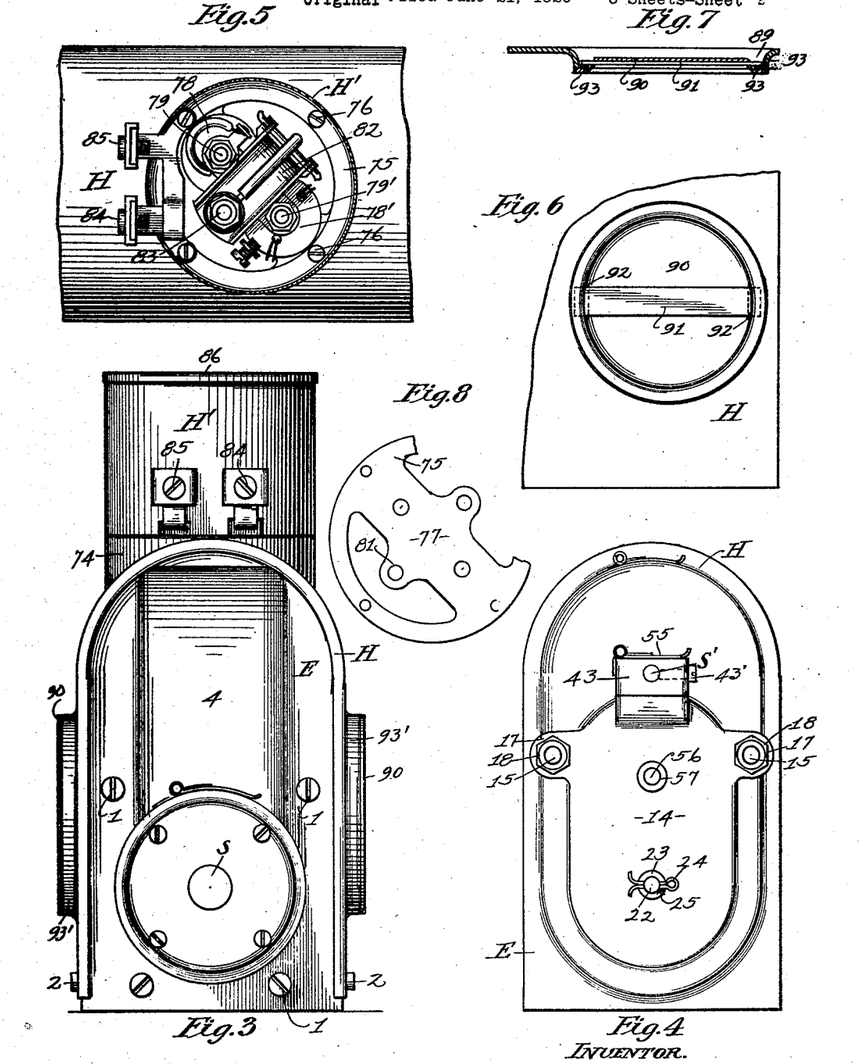
Fig. 3 is an end elevation of the generator portion of my mechanism.
Fig. 4 is an end elevation of the regulator portion of the same.
Fig. 5 is a fragmentary top plan of the housing showing a cut-out device attached thereto.
Fig. 6 is a fragmentary side view of the housing showing a suitable hand hole and cover device.
Fig. 7 is a section of the same.
Fig. 8 is a fragmentary view of the cut-out device supporting ring.
Figure 9:
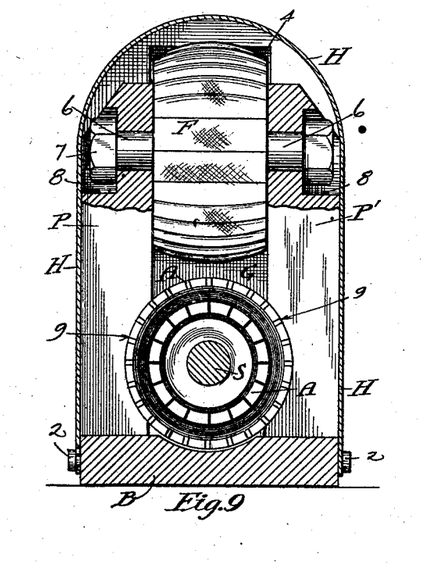
Fig. 9 is a sectional elevation of line 9—9 of Fig. 1.
Figure 10:
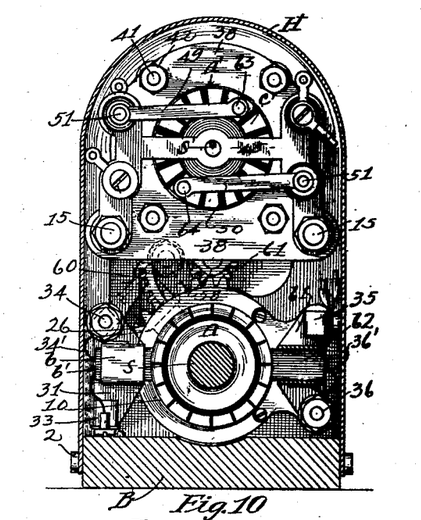
Fig. 10 is a section on line 10—10 of Fig. 1.
Figure 11:
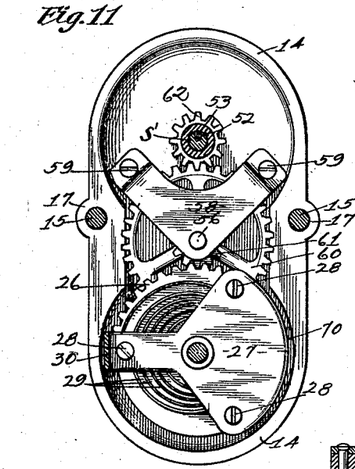
Fig. 11 is an elevation of the regulator housing end showing the mechanical connections between the regulator and generator brushes.
Figures 12, 13:
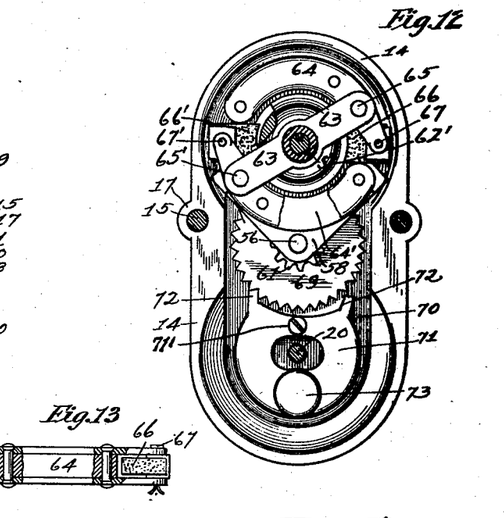
Fig. 12 is a similar view showing a clutch and escapement device forming a part of the same.
Fig. 13 is an edge view of one of the clutch elements.

The sides of housing H have openings 89, 89, which are covered by means of detachable plates shown in Figs. 6 and 7, as at 90, 90, and are adapted to be held in position by means of flat springs 91, 91 having their ends extended through slots 92 in the cover plates and engaging the overlying edges 93 of the beads 93' surrounding the openings in the housing, for affording access to the interior of the housing without removing the same from position on its supporting frame, or base B.

I have shown in the wiring diagrams of my mechanism four adaptations for use as current and voltage regulators with and without battery, which I will now describe, reference being had particularly to Figs. 21, 22, 23 and 24.

Figure 21:
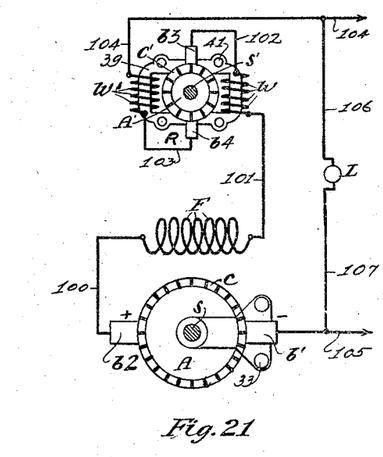
Fig. 21 is a circuit diagram for a non-battery current regulator.

Fig. 21 shows a simple form of circuit for a current regulator without a battery. Positive brush $b^2$ of the generator commutator C is connected with the generator field winding F by means of a wire 100 and a wire 101 connects the opposite end of said winding with field winding W of the regulator, while the other end of winding W is connected with brush $b^3$ by means of a wire 102. Brush $b^4$ of the regulator is connected with winding W' by means of a wire 103 and the other end of said winding has a wire 104 leading therefrom. Negative brush b' has a main wire 105 leading therefrom and the load (represented by a lamp L) may be connected with the main wires 104 and 105 by means of wires 106 and 107. Thus the current flowing from the generator G through the field windings W and W' of the regulator R will energize the armature A' of the regulator, and the current being in proportion to the speed of the generator, the speed of the armature A' will be also proportionate. Now, a momentary excess speed of the armature A' will actuate the clutch mechanism shown in Fig. 14, and through the mechanical connections between the armature A' and brush b', brush b' will be moved correspondingly against the tension of its spring 29 and the number of effective turns of the winding on armature A will be decreased, thus decreasing the current correspondingly and maintaining a substantially uniform flow of current until another variation in the speed of the generator is made.

Figure 22:
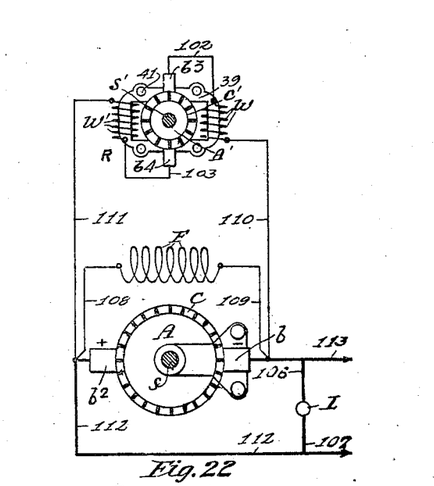
Fig. 22 is a circuit diagram for a non-battery voltage regulator.

In Fig. 22 I show a voltage regulator without battery in which the field F of the generator is connected by shunt wires 108 and 109, respectively, with brushes $b^2$ and b' and the windings W and W' of the regulator are connected with brushes b' and $b^2$ respectively by means of shunt wires 110 and 111, respectively, and winding W is connected with brush $b^3$ by the wire 102 and brush $b^4$ is connected with winding W' by the wire 103, as in Fig. 21. The main wires 112 and 113 of the system lead from the positive brush $b^2$ and negative brush $b'$, respectively, and the lamps L, are connected with said wires by wires 106 and 107, as in the case of Fig. 21.

In the non-battery voltage regulator provided in Fig. 22 the regulator field windings are of fine wire and are shunted from the generator brushes, and the voltage of the generator line is controlled by the regulator R in the same manner as the current is controlled as described in connection with Fig. 22.

Figure 23:
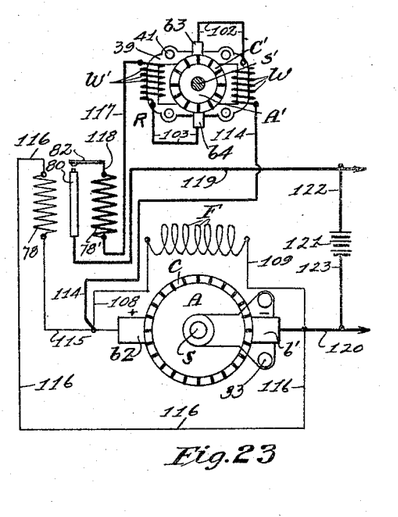
Fig. 23 is a circuit diagram for a current regulator with a battery.

For current regulation with a battery as shown in Fig. 23 I connect the generator field F by means of shunt wires 108 and 109 with the brushes $b^2$ and $b'$, as in Fig. 22, and also connect the winding W of the regulator field with brush $b^2$ by a wire 114. Windings W and W', respectively, are connected with the brushes $b^3$ and $b^4$ by the wires 102 and 103 of Figs. 21 and 22. Cut-out coil 78 has a wire 115 for connection with brush $b^2$ and a wire 116 leading therefrom to brush $b'$, and coil 78' of the cut-out has a wire 117 connecting with regulator field winding W' and also a wire 118 connecting with the contact member 82, while the contact post 80 has a main wire 119 leading therefrom. Brush $b'$ has a main wire 120 leading therefrom and a battery 121 is connected with wires 119 and 120 by the wires 122 and 123.

Figure 24:
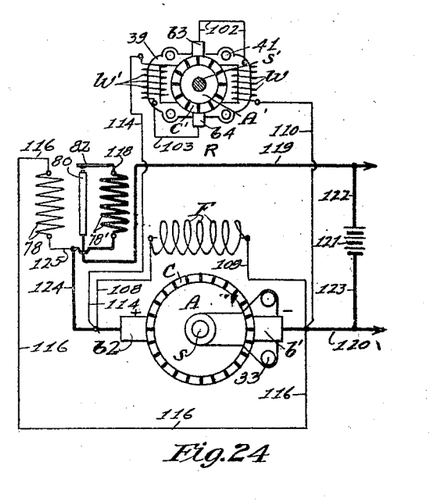
Fig. 24 is a circuit diagram for a voltage regulator with a battery.

For voltage regulation with a battery as shown in Fig. 24, the connections are substantially the same as in Fig. 23, except that cut-out coil 78' connects with brush $b^2$ by a wire 124 and coil 78 connects with wire 124 by a wire 125.

In all of the above described modifications of my system the operation of the mechanism is identical, the only difference being that the windings and connections are of different gauge for current and voltage regulation and the inter-connections between the several parts are changed correspondingly. In either case the speed of the armature A' is substantially constant regardless of the speed of the generator, except for momentary variations which serve to actuate the movable generator brush for correspondingly varying the effective turns of the generator armature. The regulator provides a balancing medium between the generator and battery heretofore unknown and capable of effective operation for accomplishing the objects of my invention, namely, the provision of a uniform flow of current, or voltage, in the battery line, regardless of the variations of speed of the generator.

When the cut-out mechanism M is used, as shown in Figs. 23 and 24 and the generator is started, the contacts 80 and 82 are normally open and will not close the generator circuit until a sufficient voltage has been attained, but when once energized the relay composed of the shunt coil 78 and the series coil 78' and the contacts 80 and 82 will remain energized until the generator is again inoperative.

What I claim is:

1. In a regulating system for electric circuits comprising a generator having relatively stationary and movable brushes, a regulator having field coils apart from said generator and electrically connected with said generator brushes, respectively, a rotatable armature between and connected with said coils, a train of gears connected with said armature shaft, a spring for actuating said gears and an escapement device operatively connected with said armature and said movable brush.

2. In a regulator for electric circuits including laminated pole pieces, field coils thereon, and an armature rotatably held therebetween, a brush adapted to be spring actuated in one direction and mounted apart therefrom, gearing resiliently connected with said armature, an escapement device connected with said gearing and said brush for controlling the movement of said brush in an opposite direction, and means for regulating the application of power to said gearing.

3. In a regulator for electric circuits including spaced field coils, an armature rotatably held therebetween, a commutator rotatable with said armature, and brushes for said commutator connected with said coils, a movable brush mounted apart from and operably connected with said armature a spring for actuating said brush in one direction, gearing connected with said springs, and an escapement device connecting said gearing and said movable brush for regulating and effecting the movement of said brush in an opposite direction relative to the speed of said armature.

4. A regulator for electric circuits comprising in combination a generator circuit, a generator armature, a relatively stationary and spring held movable brush connected with said generator armature, a gear connected with said moveable brush for resiliently holding the same at a maximum distance from said stationary brush, gearing connecting said regulator armature with said gear, and an escapement device connected with said gearing and said movable brush for controlling said brush so as to increase and decrease the effective turns of said generator armature relative to the speed of said generator for regulating the voltage therefor.

5. A device of the character described including a generator having a commutator with relatively stationary and movable brushes, a rotatable armature spaced therefrom, a spring held drum connected with the movable brush of said generator, a gear on said drum, a gear on the shaft of said armature, intermediate gears connecting said other gears and cooperating escapement devices connected, respectively, with said drum and said intermediate gears for regulating said movable brush, as described.

6. A regulating system for electric circuits comprising the combination with a generator having a generator armature and a movable generator brush, of a uniform tension spring connected with said brush, a drum enclosing said spring, gearing for operatively connecting said armature and said brush, said spring serving to hold said brush normally stationary, a clutch device connected with said armature for rendering said gearing automatically operative against the tension of said spring, and an escapement mechanism connected with said gearing for balancing the operation of said brush, for the purpose described.

7. A regulating system for electric circuits including the combination with a commutator and a brush movably held for operation in an arc concentric therewith, and a regulator armature, of a drum connected with said brush, a spring enclosed in said drum for retarding the advance of said brush, a gear connected with said drum and gearing connecting the same with said armature, a friction clutch member interposed between said gearing and said armature for advancing said brush, and an escapement device interposed between said armature and said spring for controlling the advance of said brush.

8. A regulating system for electric circuits including a commutator, a brush adjustable thereover in an arcuate path, and a regulator armature, a uniform tension spring connected with said movable brush, a drum enclosing the same and having a gear thereon, a shaft for said armature, a gear on said shaft, intermediate gearing connecting said armature gear with said drum gear, a friction driving device connecting said armature gear with said armature, and an escapement mechanism for controlling the operation of said gearing.

9. The combination with a generator and a regulator of the character described, and a movable brush for said generator, a drum mounted in axial alinement with the generator armature, a spring enclosed thereby and connected with said brush, gearing connecting said armature with said drum, said spring tending to retract said brush, and said armature tending to advance the same, and a friction driving mechanism interposed between said gearing and said armature, as described.

10. The combination with a generator and a regulator of the character described, and a movable brush for said generator, a drum mounted in axial alinement with the generator armature, a spring enclosed thereby and connected with said brush, gearing connecting said armature with said drum, said spring tending to retract said brush, and said armature tending to advance the same, and a friction driving mechanism interposed between said gearing and said armature, an escapement member connected with said drum, and an associated member connected with said gearing for controlling the operation of said brush.

EDMUND E. TAEUBERT.